United States Patent [19]

Struger et al.

[11] Patent Number: 4,888,726
[45] Date of Patent: Dec. 19, 1989

[54] DISTRIBUTED PROCESSING IN A CLUSTER OF INDUSTRIAL CONTROLS LINKED BY A COMMUNICATIONS NETWORK

[75] Inventors: Odo J. Struger, Chagrin Falls, Ohio; Barry E. Sammons, Whitefish Bay, Wis.

[73] Assignee: Allen-Bradley Company, Inc., Milwaukee, Wis.

[21] Appl. No.: 41,208

[22] Filed: Apr. 22, 1987

[51] Int. Cl.$^4$ .................... G06F 13/14; G06F 13/00
[52] U.S. Cl. .................. 364/900; 364/200; 364/229.3; 364/241.1; 364/962.1; 364/964; 364/927
[58] Field of Search ... 364/200 MS File, 900 MS File, 364/131, 134, 474.11, 200

[56] References Cited

U.S. PATENT DOCUMENTS

| | | | |
|---|---|---|---|
| 3,881,172 | 4/1975 | Bartlett et al. | 364/200 |
| 4,031,512 | 6/1977 | Faber | 364/200 X |
| 4,034,354 | 7/1977 | Simmons | 364/900 |
| 4,095,094 | 6/1978 | Struger et al. | 364/900 X |
| 4,107,784 | 8/1978 | Van Bemmelen | 364/900 |
| 4,240,143 | 12/1980 | Besemer et al. | 364/200 |
| 4,245,306 | 1/1981 | Besemer et al. | 364/200 |
| 4,253,144 | 2/1981 | Bellamy et al. | 364/200 |
| 4,253,146 | 2/1981 | Bellamy et al. | 364/200 |
| 4,319,338 | 3/1982 | Grudowski | 364/900 |
| 4,430,699 | 2/1984 | Segarra et al. | 364/200 |
| 4,442,504 | 4/1984 | Dummermuth et al. | 364/900 |
| 4,477,882 | 10/1984 | Schumacher | 364/900 |
| 4,527,270 | 7/1985 | Sweetan | 371/11 |
| 4,539,655 | 9/1985 | Trussell et al. | 364/900 |
| 4,550,366 | 10/1985 | Toyama et al. | 364/134 X |
| 4,667,323 | 5/1987 | Engdahl | 340/825.52 X |

Primary Examiner—Parshotam S. Lall
Assistant Examiner—Edward R. Cosimano

[57] ABSTRACT

A cluster of control processors are interconnected by a local area network and exchange data to carry out their control functions. Each controller executes a control program containing both conventional instructions and T-instructions which call for an operation on data maintained by another controller in the cluster. All data required to execute T-instructions is stored in a virtual I/O image table and each controller is responsible for keeping its section of this table up-to-date by periodically broadcasting its data on the local area network.

11 Claims, 13 Drawing Sheets

VIRTUAL I/O W/R TABLE 82

```
┌─────────────────────────────┐ ← 67
│                             │
├─────────────────────────────┤
│ STATION 1                   │
│ VIRTUAL I/O IMAGE SECTION   │
├─────────────────────────────┤
│ STATION 2                   │
│ VIRTUAL I/O IMAGE SECTION   │
├─────────────────────────────┤
│ STATION 3                   │
│ VIRTUAL I/O IMAGE SECTION   │
├─────────────────────────────┤
│ STATION 4                   │
│ VIRTUAL I/O IMAGE SECTION   │
├─────────────────────────────┤
│            .                │
│            .                │
│            .                │
│            .                │
├─────────────────────────────┤
│ STATION 62                  │
│ VIRTUAL I/O IMAGE SECTION   │
├─────────────────────────────┤
│ STATION 63                  │
│ VIRTUAL I/O IMAGE SECTION   │
└─────────────────────────────┘
```

FIG. 5

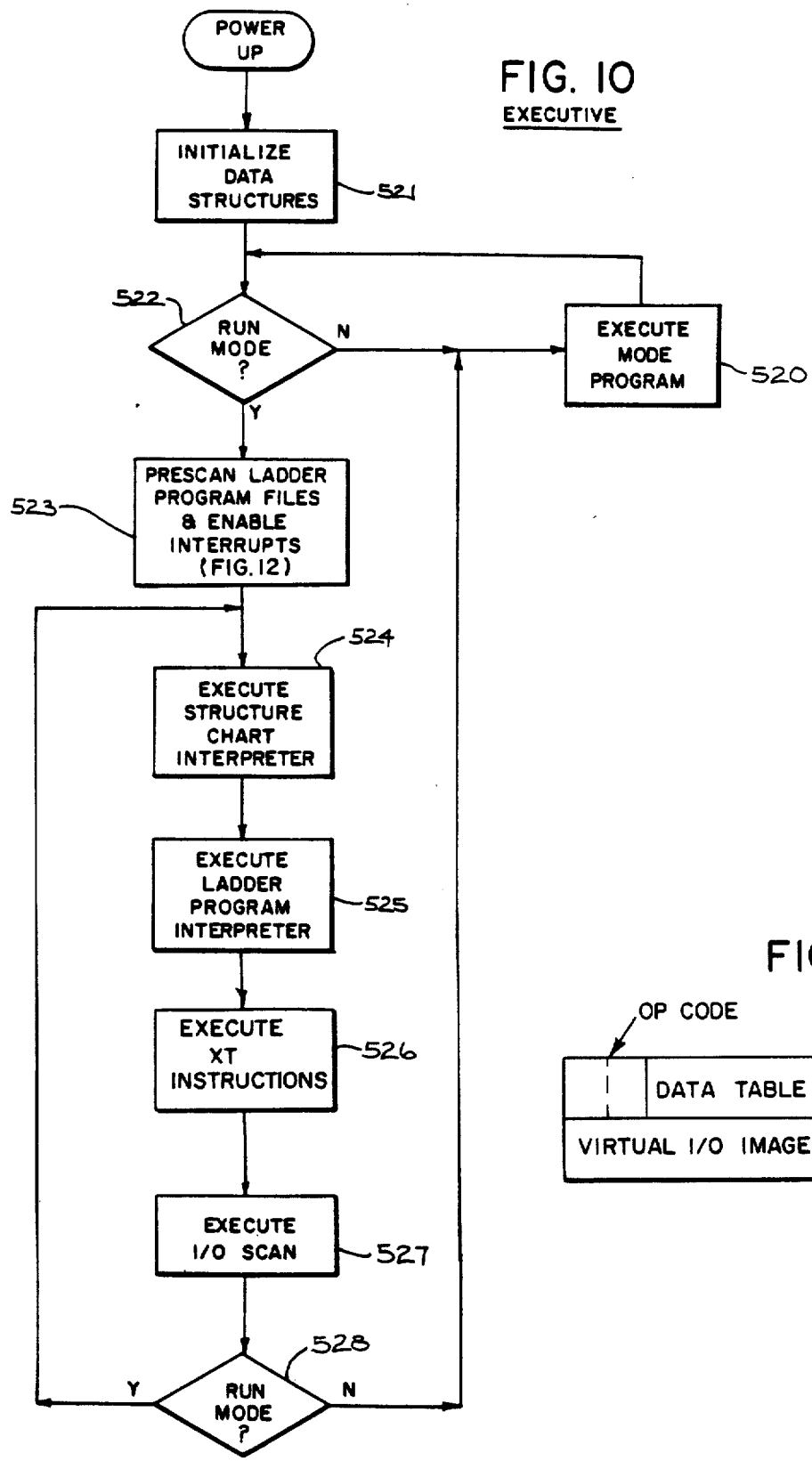

2

DISTRIBUTED PROCESSING IN A CLUSTER OF INDUSTRIAL CONTROLS LINKED BY A COMMUNICATIONS NETWORK

BACKGROUND OF THE INVENTION

The field of the invention is industrial control systems, and, particularly, systems which include a plurality of processors, such as programmable controllers, numerical controls and process controls, which are interconnected by a communications network.

There is a wide variety of communications networks which have been employed to interconnect industrial control processors. Such networks include a communications media such as coaxial cable, fiber optics or twisted wire pairs, and they may have any one of a number of topologies, such as a star, multidrop, or ring. Regardless of the media used or the topology of the network, a control scheme is required to provide an orderly transfer of information from one station to another on the network. Many such control schemes are known in the art and attempts have been made to develop standards which enable manufacturers to design equipment which will work on networks that comply with the standard. For example, the Institute of Electrical and Electronic Engineers (IEEE) has developed IEEE Standard 802.4, entitled "Token Passing Bus Access Method and Physical Layer Specification" which sets forth the basic operating procedures to be followed by compliant stations.

The concept of distributed processing, or the control of real time devices with a plurality of interconnected control processors, is an old one. Such distributed processing has been successfully implemented in many applications where "real time" is measured in seconds, minutes, or even hours, and the communications delay between the distributed processors has not been a limiting factor. There are few successful applications, however, where the distributed processors are controlling devices which operate in real times measured in milliseconds, and data from one processor must be conveyed to another at rates commensurate with the operation of such real time devices.

In U.S. Pat. No. 4,747,100, which was filed on Aug. 11, 1986 and is entitled "Improved Token Passing Network," a local area network suitable for peer-to-peer communications between station level controllers is described. This local area network is based on the IEEE 802.4 token passing standard, but it includes unique extensions which make it particularly useful for high speed distributed processing applications.

One of the difficulties with any prior control system which employs distributed control processors is the level of skill and the large effort required to configure, or program, the system. Typically, each control processor in the system must be programmed in its own language to carry out its specific control tasks. In addition, each control processor must be separately programmed in its own language to provide data to other control processors in the system and to receive data from other such control processors. Such programming involves instructions which expressly send or receive data through the local area network linking the control processors. This task requires that the programmer know how to use the network protocol and that he use it in such a way as to provide the necessary data between processors at the required rate without overloading, or "hogging", the network.

SUMMARY OF THE INVENTION

The present invention relates to a method and means for interconnecting a plurality of control processors such that they work efficiently together to provide real time control of process or manufacturing equipment. More specifically, the present invention includes a cluster of control processors interconnected by a local area network in which each control processor includes means for storing a virtual I/O image table which contains sections therein associated with each control processor in the cluster, means for broadcasting on the network the control processor's own section of the virtual I/O image table, means for receiving similar virtual I/O image data broadcast by other control processors in the cluster and storing the same in the associated section of the virtual I/O image table, means for storing a control program and executing special T-instructions contained therein which examine or operate on I/O data associated with other control processors, and means for signaling the other control processors that I/O data associated with them should be included in their section of the virtual I/O image table.

A general object of the invention is to provide an efficient, high speed exchange of I/O data between the control processors in a cluster. The T-instructions identify the control processor and the particular I/O data which is required of it. That I/O data along with the I/O data required by other T-instructions in any of the control processors is broadcast to all control processors automatically each time the token is passed around the local area network. The I/O data required by other control processors in the cluster is thus exchanged once for each revolution of the token. In addition, because the I/O data is exchanged automatically as part of the token pass, there is no additional overhead placed on the local area network by this exchange.

Another object of the invention is to provide an easy to use means for coordinating the operation of a cluster of interconnected control processors. The T-instructions are included in the user's control program for each processor and they are distinguished from other instructions in the instruction set only by the fact that they identify another control processor in the cluster as the location of the operand. The user need not, therefore, learn a set of new instructions nor learn how to program the use of the local area network. Instead, the control processor alerts the other control processors in the cluster of the I/O data needed by the T-instructions in its control program. That I/O data is then included in the virtual I/O image table and automatically updated as the token is passed around the cluster.

Another object of the invention is to operate on data from other control processors in the cluster without undue reduction in the rate at which the control processor executes, or scans, its control program. The T-instructions in the processor's program operate on data in the processor's own copy of the virtual I/O image table. Such operations require no more execution time than normal instructions which operate on local I/O data. The coupling of I/O data between control processors in the cluster to update their copies of the virtual I/O image table is performed separately as part of the local area network link layer functions and is totally transparent to the user or programmer.

A more specific object of the invention is to provide current I/O data from other control processors in the cluster. The I/O data from each control processor is broadcast each time the control processor receives and passes the network token. The rate at which the token circulates is the maximum rate at which data may be exchanged in such a local area network and this rate is usually guaranteed not to deteriorate even though other information may also be conveyed on the network. Thus, very current data is present in each control processor's copy of the virtual I/O image table.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 5 is a schematic representation of the virtual I/O W/R table which is stored in the controller of FIG. 4;

FIG. 10 is a flowchart of an executive program executed by the controller section of FIG. 6;

FIG. 11 is a schematic representation of an XT instruction which is stored in the controller section of FIG. 6;

GENERAL DESCRIPTION OF THE INVENTION

Figure 14:
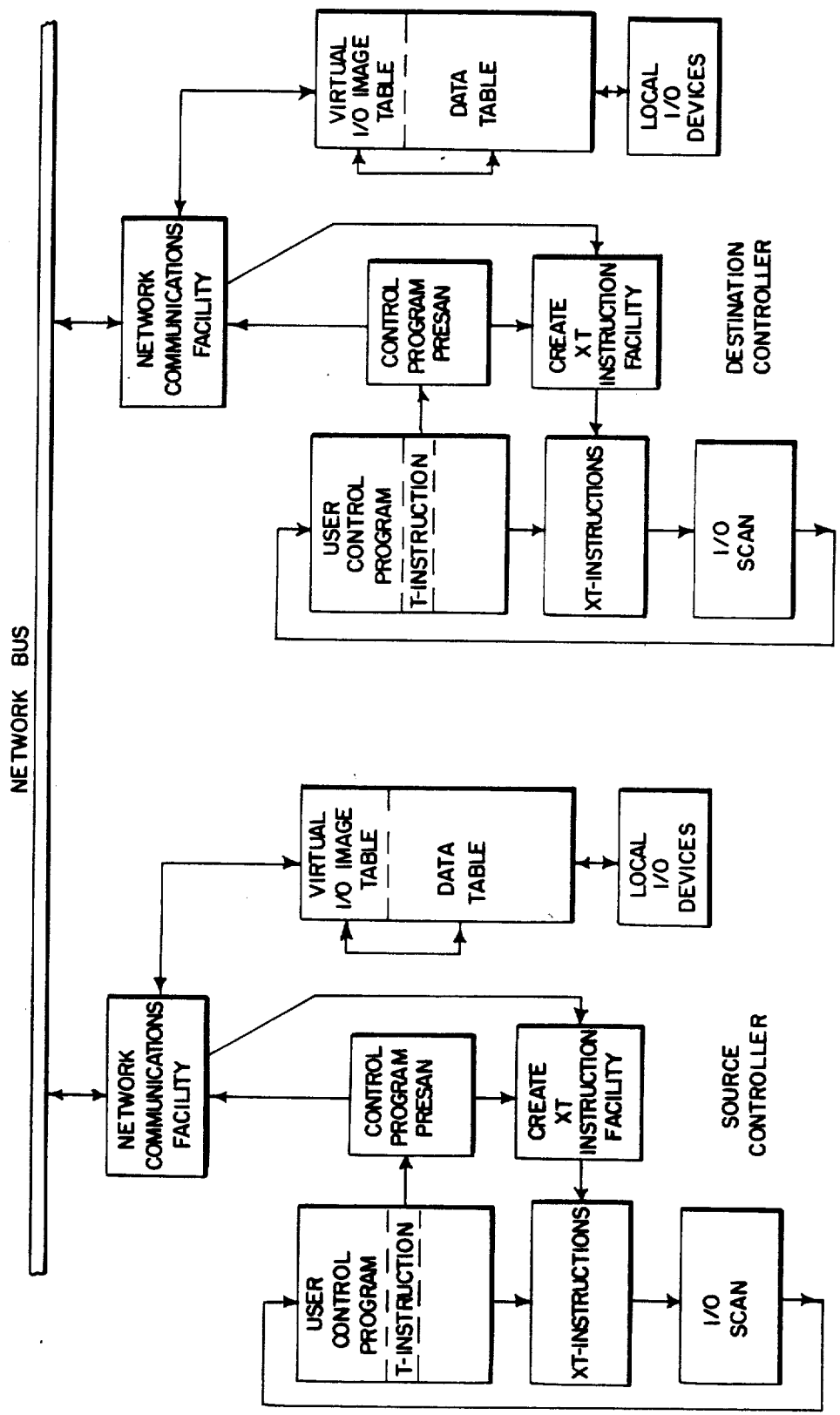
FIG. 14 is a block diagram of a controller cluster which employs the present invention and which illustrates very generally the functions of the present invention.

Before describing the preferred embodiment of the present invention, a very general and conceptual description of the invention will be made with respect to FIG. 14. This drawing illustrates two controllers connected to a common network bus. One controller will be called a "source" controller, and the other a "destination" controller, although these may, in fact, be identical in operation and there may be many other such controllers on the network bus.

Each controller has a network communications facility which enables the controller to send messages to and receive messages from other controllers on the network. In addition, this network facility periodically broadcasts to all other controllers the contents of its section of a virtual I/O image table which is stored at the controller, and it receives such broadcasts from all other controllers and updates their sections of this table. Each controller thus stores a virtual I/O image table which is automatically and continuously kept up to date with data from the other controllers in the network. The present invention employs this virtual I/O image table and this update facility to enable one controller to operate I/O devices associated with another controller.

The present invention is incorporated into standard controllers. Such standard controllers include a user control program which contains instructions in one of the well known programming language instruction sets. This user control program is executed to operate on data in a stored data table. Periodically, an I/O scan is performed in which data from this table is output to operate local I/O devices and the sensed condition of these local I/O devices is input to the data table. The stored data table thus includes an image of the state of the controller's local I/O devices.

The present invention is employed when the user or programmer inserts one or more T-instructions into the user control program. In most respects, a T-instruction is like other instructions in the user control program except it includes as part of its operand the address of an I/O device on another controller in the cluster. Actually, any data in the other controller's data table can be addressed with such a T-instruction.

Such remote data may be operated upon by the T-instruction in two ways: it can examine, or read, the remote data, and it can output, or write over, the remote data. It is an important aspect of the present invention that when a T-instruction is executed, it operates on an updated copy of the remote data which is maintained locally in the controller's own virtual I/O image table. To do otherwise, that is, operate directly on the remote data, would drastically increase the execution time of each T-instruction and the user control program. Such an increase in execution time is unacceptable in real time, factory automation applications regardless of the speed of the local area network employed to link the controllers.

The objective then is to place the data required by the T-instructions into the virtual I/O image table. Referring particularly to FIG. 14, before executing the user control program in the source controller, a control program prescan is performed to detect the presence of T-instructions. When a T-instruction is located which operates on data in the destination controller, a series of events occur which establish a location in the virtual I/O image table where the data will be found. When the T-instruction is subsequently executed, therefore, it operates on this location and the destination controller automatically makes the transfer between this virtual I/O image table location and the proper location in its own data table. The manner in which these linkages are formed is different for T-instructions which read data from another controller and T-instructions which write data to another controller.

When a read T-instruction is detected by the program prescan, the source controller sends that instruction to the destination controller using a virtual I/O request message. The network communications facility at the destination controller routes the received T-instruction to a create XT instruction facility and returns an I/O request acknowledge message to the source controller. This acknowledge message indicates the location in the virtual I/O image table where the desired data will be found. This location is stored with the T-instruction for use during its execution by the source controller. Meanwhile, at the destination controller, its create XT instruction facility has produced an XT instruction and stored it for execution by the destination controller. This XT instruction is executed periodically as part of the user control program or as part of the normal I/O scan, and it simply transfers the desired data from the destination controller's data table to the indicated location in the virtual I/O image table. The linkages are thus established for a read-type T-instruction.

The linkages for a write-type T-instruction are established differently. The control program prescan assigns a virtual I/O image table location to which the T-instruction may write data. This location is stored with the T-instruction at the source controller, and it is sent as part of a virtual I/O request message to the destination controller. The create XT instruction facility at the destination controller receives this message and produces a suitable XT instruction. This is stored for execution as described above and it causes the data in the indicated location of the virtual I/O image table to be transferred to the indicated location in the destination controller's data table. An I/O request acknowledge message is returned to the source controller and the linkages are thus established.

Other than the virtual I/O request and the resulting acknowledge message which is sent on the network during the control program prescan, no other special messages are required. The virtual I/O image tables are maintained automatically as part of other network functions. For example, in the preferred embodiment of the invention each controller broadcasts its section of the virtual I/O image table when it passes the communications token to another controller. Thus, there is very little network overhead required to implement the present invention.

DESCRIPTION OF THE PREFERRED EMBODIMENT

A complex industrial process may employ a cluster of controller processors, each operating in a coordinated fashion. This requires that the controller processors, and other elements of the system, communicate with their peers to exchange commands, reports, status and I/O data. A network type of communication is best suited for this function because it allows flexible communications between any of the controller processors in the system.

Figure 1:
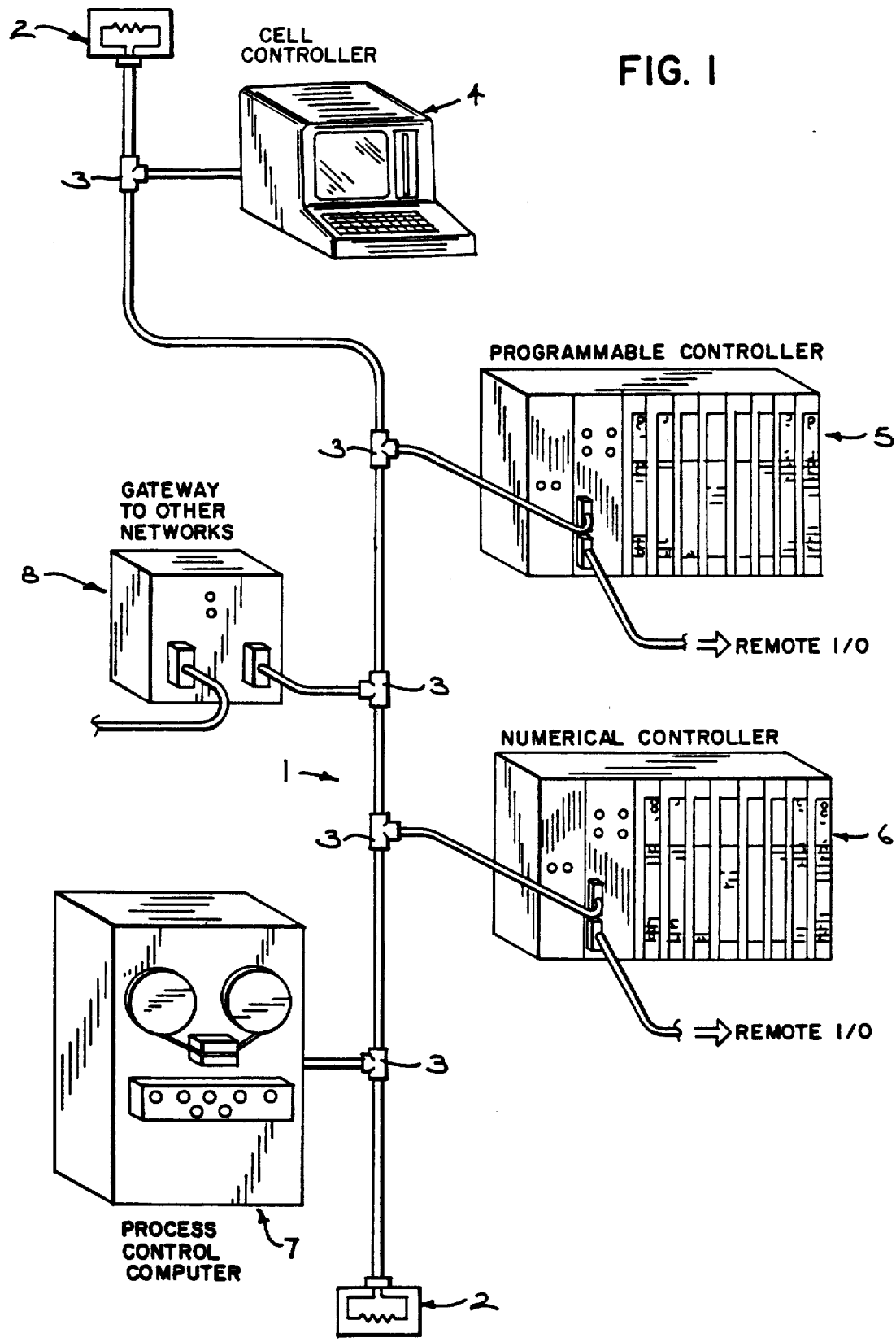
FIG. 1 is a perspective view of a controller cluster which employs the present invention.

Referring to FIG. 1, an example processor cluster and communications network includes a bus 1 with passive terminations 2 at each end and taps 3 into the bus 1 at various points for connection of the controller processors to be included in the network. This example network has connected a cell controller 4, a programmable controller 5, a numerical controller 6, a process control computer 7, and a gateway 8 to other networks (not shown). For purposes of communicating on the bus 1, each of the controller processors mentioned above is considered a "station" on the bus 1. Each such station has a unique address on the bus 1 which is used to identify the source and destination for message traffic on the bus. The station address is also used to organize the stations on the bus 1 into a logical ring. The logical ring is merely the sequence which is used to take turns for control of the bus 1. To transfer control of the bus 1 to the next station in the logical ring, a distinctive control code is sent to the next station. That control code means "you now have control of the bus" and such a control code is called a token.

Token passing logical rings are well known in the art as a means for implementing an orderly discipline for control of a shared broadcast communications media. In a token passing logical ring, only one station has control over the media at any one time. Control over the media can include transmitting messages and commanding other stations to transmit a response. That station having control over the media is said to "possess the token" at that time. When the station having the token is finished performing the tasks for which it required control over the media, it "passes" the token to another station. The token thus passes from station to station in some ordered manner, usually in order of increasing station address and then back to the lowest address thereby forming a logical ring. The order in which the token is passed is completely independent of the physical media and the physical arrangement of the stations on the media. It should be apparent to those skilled in the art that this logical ring configuration is independent of the particular media (wire, cable, fiber optics, etc.) or network topology (ring, trunk, star, etc.).

For a detailed description of the communications network employed by the preferred embodiment of the invention, reference is made to the above-cited co-pending application entitled "Improved Token Passing Network", the disclosure of which is incorporated herein by reference.

The equipment on the bus 1, namely the cell controller 4, the programmable controller 5, numerical controller 6, and process control computer 7, represent a typical configuration as might be found in a manufacturing cell environment. Each of the controllers 4, 5, 6, and 7 are programmed to interact with one another to achieve some overall function in a coordinated manner. The mechanism required to achieve that coordination is provided by the present invention.

Figure 2:
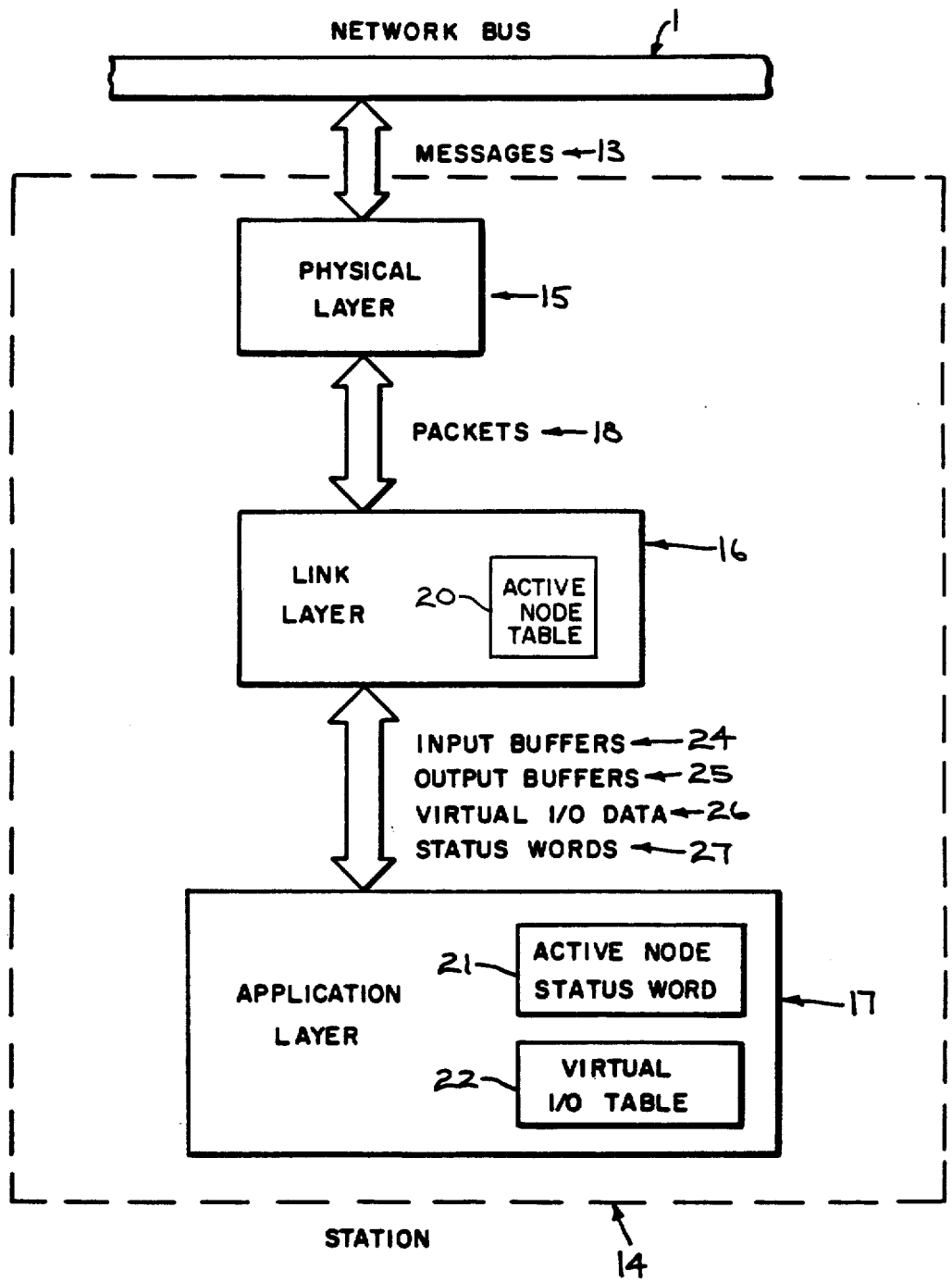
FIG. 2 is a logical representation of the protocol layers in each controller of FIG. 1.

Referring to FIG. 2, each station 14 on the communications network can be logically represented in terms of the protocol layers 15, 16 and 17 used to implement the token passing logical ring. These layers are the physical layer 15, the link layer 16, and the application layer 17. The layers 15, 16, and 17 generally are based on the corresponding layers 1, 2, and 7 (not shown) of the International Standards Organization (ISO) seven layer reference model for Open Systems Interconnection (OSI). While layers 3 through 6 of the ISO model representing the network, transport, session, and presentation layers are not included in this embodiment, their inclusion would be obvious to one of ordinary skill in the art. In this embodiment, any necessary functions which would normally be performed by layers 3 through 6 of the ISO model are instead performed by the link layer and application layer as described below.

The physical layer 15 performs the actual transmission and reception of messages 13 onto the network bus 1. The physical layer 15 converts the messages from the network bus 1 to packets 18 of information and vice versa by appending or stripping certain formating characters as described below. The packets 18 are exchanged between the physical layer 15 and the link layer 16. It is the link layer 16 which implements the token passing logical ring. The link layer 16 performs all of the automatic network maintenance functions such as claiming the token, passing the token, soliciting a successor, and sending acknowledgements. The link layer 16 also maintains an Active Node table 20 by monitoring token passes on the network. The application layer 17 is the highest level protocol layer which represents the main processing being performed at the station 14. The link layer 16 represents an access service to the token passing logical ring for use by the application layer 17. Communications between the link layer 16 and the application layer 17 are by means of input buffers 24, output buffers 25, virtual I/O data 26, and status words 27 as described in detail below. One specific status word sent from the link layer 16 to the application layer 17 is the Active Node Status Word (ANSW) 21.

The ANSW 21 contains one bit for each possible station address on the network. The link layer 16 generates the ANSW 21 by setting those bits which correspond to the addresses of the stations active in the logical ring as indicated in the Active Node table 20. The application layer 17 is thus automatically appraised of the on-line status of each station on the network through the ANSW 21.

A virtual I/O image table 22 in the application layer 17 is kept continually updated by the link layer 16. The link layer 16, as described in detail below, receives and processes all token pass messages on the network in order to maintain the Active Node table 20. Because the token pass messages are received and processed at all stations, it is possible with a network of this type to include data in the token pass message. In this embodiment, the data field in the token pass message contains virtual I/O image data 26. The virtual I/O data is generated by each station to indicate information about the generating station. The exact definition of each bit of virtual I/O data 26 is determined by the application layer 17 as will be described in more detail below. As an example, one bit of virtual I/O data 26 may mean that a process being performed by another controller processor on the network has been completed or that a sensing device connected to that processor has opened or closed. Another bit of virtual I/O data 26 may be used to request that a process be performed by another controller processor on the communication network. The virtual I/O data 26 thus does not originate from the physical I/O customarily associated with industrial controllers and so is kept in a separate virtual I/O table 22. This virtual image I/O table 22 is kept continually updated by the network automatically and without the need for any high level messages from the application layer 17.

Figure 3:
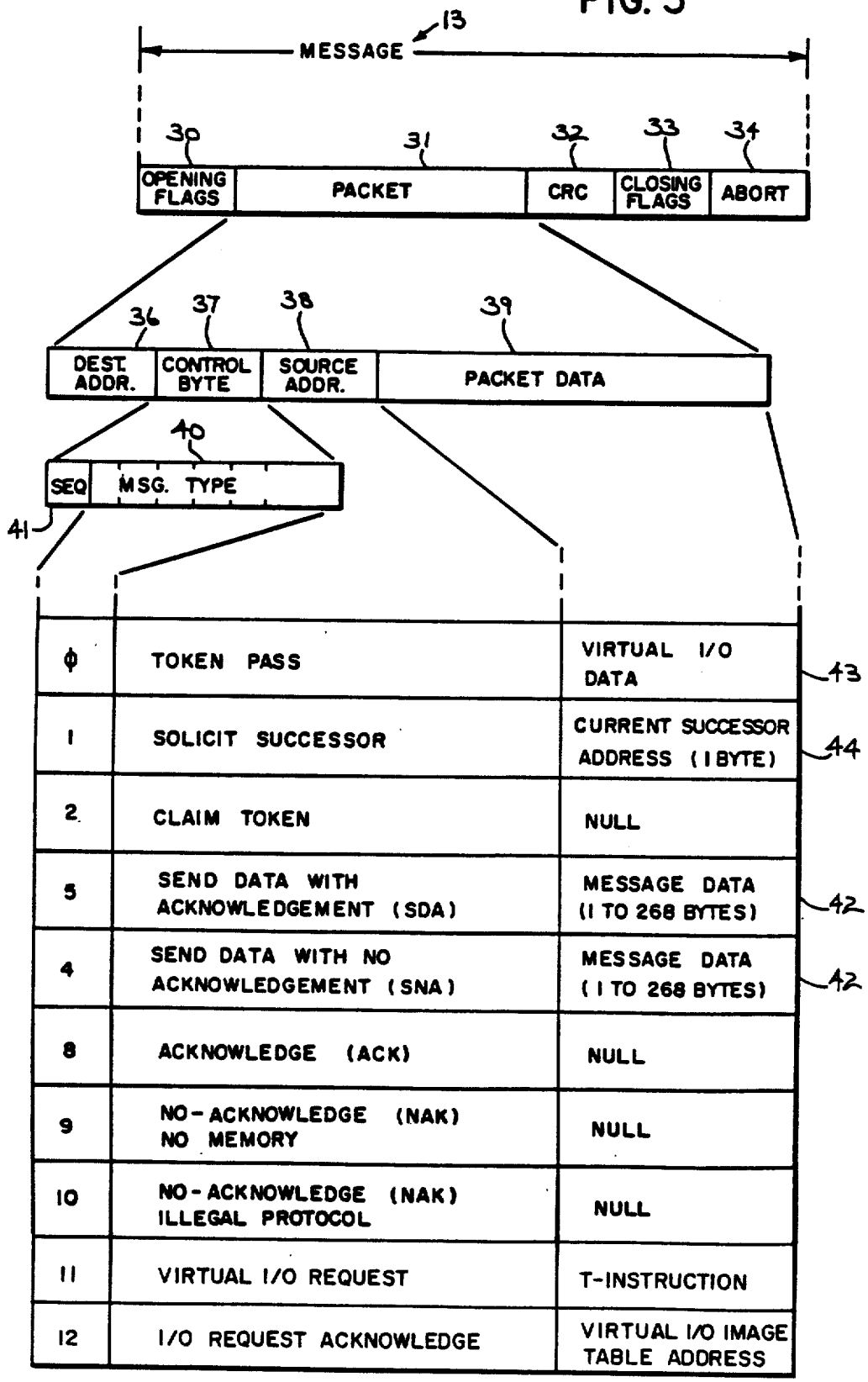
FIG. 3 is a schematic representation of the structure of the messages which are sent on the network that links the controllers in FIG. 1.

Referring to FIG. 3, the messages 13 which are conveyed over the network bus 1 are comprised of a series of ones and zeros which implement a bit-oriented protocol. The protocol used in this embodiment is the industry standard Synchronous Data Link Control (SDLC) format. A Serial Communications Controller (SCC) type Z8030 manufactured by Zilog, Inc. is used to implement the SDLC protocol as described in the hardware description below. A complete message 13, or frame, includes opening flags 30, a packet 31, Cyclical Redundancy Check (CRC) characters 32, closing flags 33, and an abort character 34. The packet 31 is exchanged between the link layer 16 and the physical layer 15. The opening flags 30, CRC characters 32, closing flags 33, and abort character 34 are used only by the physical layer 15. They are appended to the packet 31 for transmission and stripped from the packet 31 upon reception automatically by the SCC. The opening flags 30 (three bytes long) allow the receiver to synchronize to the incoming data stream while the closing flags 33 (one byte) and abort character 34 (one byte) are used to detect the end of the message 13. The CRC characters 32 (two bytes) provide an error check on the message 13 as is well known in the art.

Each packet 31 includes four segments: a destination address 36; a control byte 37; a source address 38; and packet data 39. The destination address 36 is one byte in length and it indicates the station address of the controller processor to which the message is being sent. A destination address of "255" indicates that the message is "broadcast" to all stations. Similarly, the source address byte 38 indicates the address of the station which originated the message. The control byte 37 includes seven bits which identify the nature, or "type" 40, of message. A single bit 41 (SEQ) which is part of the control byte 37 is employed as a toggle to detect duplicate messages.

There are twelve message types indicated by the control byte 37:

0 = token pass message which is employed to pass the token and to broadcast virtual I/O Data.

1 = solicit successor (SOS) message which is employed to locate a station which is waiting to join the logical ring.

2 = claim token message used to establish ownership of the token during network initialization or if the token is lost.

5 = Send Data with Acknowledgment (SDA) message which delivers data to the destination address and requests a response of either an acknowledgment (ACK) message to confirm an error free delivery or a No-acknowledge (NAK) message indicating an error in message reception.

4 = Send Data with No Acknowledgment (SDN) message which delivers data to the destination address without requesting a response.

8 = Acknowledge (ACK) message indicating the error free reception of a preceding SDA message.

9 = No Acknowledge (NAK)—No memory, which indicates that the preceding SDA message was not accepted due to the unavailability of an input buffer.

10 = No Acknowledge (NAK)—Illegal Protocol, which indicates that the preceding SDA message violated the maximum length limit.

11 = virtual I/O request which sends a T-instruction from the source controller to the destination controller asking the destination controller to couple a specific location in its I/O image table to its section of the virtual I/O image table 22.

12 = I/O request acknowledge which is sent back by the destination station in response to a virtual I/O request.

Referring again to FIG. 3, the packet data field 39 varies in both content and length depending on the type of the message. For claim token (type 2), ACK (type 8), NAK—No. memory (type 6) and NAK—Illegal Protocol (type 7) messages, the packet data field 39 is null (i.e. zero length). For SDA and SNA messages (types 5 and 4, respectively) the packet data field 39 contains actual message data 42. The message data 42 is the specific information to be communicated to the recipient station. The format of the message data 42 is determined by the communicating application layers. An arbitrary maximum length of 268 bytes is enforced for the message data 42 in this embodiment of the invention to limit the amount of time that any one station holds the token.

In a token pass message (type 0) the packet data field 39 contains virtual I/O data 43. The inclusion of the virtual I/O data 43 in the token pass message allows the maintenance of virtual I/O tables at each station without the need for high level message traffic. As will be explained in more detail below, the specific content and amount of virtual I/O data 43, which is transmitted by each station during its token pass, is determined by the requests which have been made by other stations for I/O data.

The virtual I/O request message (type 11) is sent by a source station to another station (the destination), and the packet data field therein contains a T-instruction which is contained in the source station's control program. As will be explained in detail below, such T-instructions include an operation code and an operand address. The operand address identifies I/O data in the destination station controller and the operation code indicates the operation which is to be performed with that data. If data is to be written to the destination station, the message also includes a virtual I/O address which indicates where in the virtual I/O image table that data will appear.

The I/O request acknowledge message (type 12) is the destination station's response to the virtual I/O request message (type 11). Its packet data field 39 contains the T-instruction from the originating station along with an address, which indicates where in the virtual I/O image table 22 the requested I/O data from the destination station will be located.

Finally, in a solicit successor (SOS) message (type 1), the packet data field 39 contains a one byte value 44 which is the address of the current successor for the station sending the SOS message. This current successor address 44 is used by the station being solicited to indicate to it the next station to get the token after the solicited station joins the logical ring.

Referring back to FIG. 1, as mentioned above, each controller 4, 5, 6, 7, and 8 in the network interfaces to the bus 1. Each station 4, 5, 6, 7, and 8 has a compatible physical interface to the bus 1, but more importantly must also implement the protocol of the present invention. Since each station 4, 5, 6, 7 and 8 has a common protocol implementation, the description below of the present invention as applied to the programmable controller 5 also applies to any of the other stations and their controller processor.

HARDWARE DESCRIPTION

The programmable controller 5 is that which is described in U.S. Pat. No. 4,742,443 which was filed on Mar. 28, 1985, and which is entitled "Programmable Controller with Function Chart Interpreter," the contents of which are incorporated herein by reference.

Figure 4:
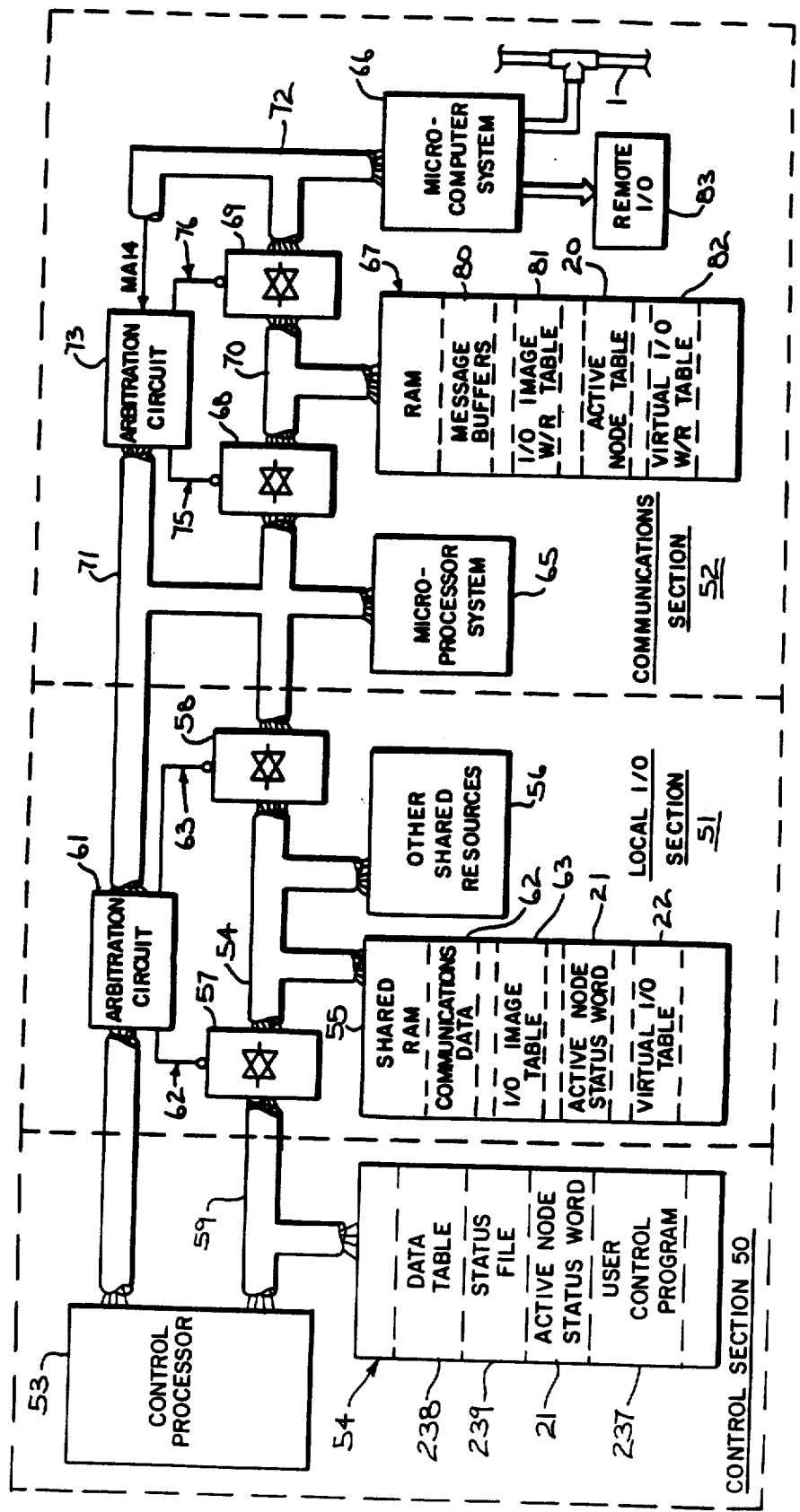
FIG. 4 is a block diagram of a programmable controller which employs the present invention and which forms part of the controller cluster in FIG. 1.

Referring to FIG. 4, the programmable controller includes three main sections: a control section 50, a local I/O section 51, and a communications section 52. The control section 50 includes a control processor 53 which performs the main processing for the programmable controller 5, including execution of a user control program stored in a memory 54. The memory 54 also stores a data table and a status file for use in executing the user control program. The status file includes the Active Node Status Word 21, indicating which nodes are currently active in the logical ring. The structure and maintenance on this Active Node Status Word 21 will be discussed in greater detail below.

The communications section 52 contains two computing systems designated herein as a microprocessor system 65 and a microcomputer system 66. The microprocessor system 65 is based on a Z-80 microprocessor manufactured by Zilog, Inc., while the microcomputer system is based on a Z8 Microcontroller also manufactured by Zilog, Inc. The two systems 65 and 66 share a common RAM 67 through a pair of transceivers 68 and 69. The transceiver 68 provides for connection of a RAM bus 70 to a microprocessor system bus 71, while the other transceiver 69 provides for connection of the RAM bus 70 to a microcomputer system bus 72. An arbitration circuit 73 also connected to the respective system buses 71 and 72 provides enabling signals 75 and 76 to the two transceivers 68 and 69 to establish the appropriate connection. The RAM 67 is thus accessible to both the microprocessor system 65 and the microcomputer system 66 and contains message buffers 80, an I/O image W/R table 81, the Active Node table 20, and the virtual I/O W/R table. The microcomputer system 66 is a dedicated processor which has as its sole function the transmission and reception of data to and from serial I/O links which service the network bus 1 and remote I/O racks 83.

The local I/O section 51 is configured around a shared bus 54 which provides access to a shared RAM 55 and other shared resources 56. The shared RAM 55 includes a communications data area 62, an I/O image table 63, a copy of the Active Node Status Word 21, the virtual I/O image table 22. The I/O image W/R table 81 and the virtual I/O W/R table 82 in the RAM 67 are write/read working tables which are used for I/O operations and are periodically updated with the corresponding I/O image table 63 and virtual I/O table 22 in the shared RAM 55.

The other shared resources 56 include various inputs and outputs (not shown) plus an interface to a local I/O rack backplane (not shown). A detailed description of these other shared resources 56 is described in the above-cited U.S. Pat. No. 4,742,443.

The shared bus 54 connects to two sets of transceivers 57 and 58 for interface to a control section system bus 59 and the microprocessor system bus 71 of the communication section 52, respectively. An arbitration circuit 61 resolves contention for the shared bus 54 by monitoring the control system bus 59 and the microprocessor system bus 71 and generating the appropriate enabling signals 62 and 63 for the two transceivers 57 and 58, respectively.

The general operation of the programmable controller 5 can now be described. The microcomputer system 66 provides the lowest level communications function to the communications network. The functions performed by the microcomputer system 66 represent the physical nd link layers of the network As such, the microcomputer system 66 performs all the necessary network maintenance functions including updating of the Active Node table 20 and the virtual I/O W/R table 82 in the RAM 67. These network maintenance functions are performed automatically by the microcomputer system 66, and are thus completely transparent to the other processors in the programmable controller 5.

In addition, to the network maintenance functions, the microcomputer system 66 also provides for the reception and transmission of messages on the communications network. The flow of events for the reception of the messages is as follows. For an incoming message, the microcomputer system 66 receives each byte of the message one by one and assembles the bytes in an input buffer in the message buffer 80 area of the common RAM 67. When the message is complete, a flag (not shown) in the RAM 67 is set to signal the microprocessor system 65 of the completion of the message. The microprocessor system 65 then moves the completed message into the communications data area 62 of the shared RAM 55, and sets another flag (not shown) in the shared RAM 55 indicating the arrival of the message to the control section 50. The control section 50 interrogates the incoming message flags every 10 milliseconds as a part of 10 millisecond interrupt service routine. When the incoming message flag is so detected, the control section 50 reads the message from the communications data area 62 in the shared RAM 55, and may then process the message as required.

Similarly, when the control section 50 has a need to transmit a message onto the communications network, the control section 50 generates a formatted packet 31 and places it in the communication data area 62 of the shared RAM 55. The control section 50 then interrupts the microprocessor system 65 of the communications section 52 to indicate the presence of the output packet 31. The microprocessor system 65 then transfers the output packet 31 to the message buffer 80 of the RAM 67, and sets an output flag (not shown) indicating that a message is waiting for transmission. When the microcomputer system 66 next acquires the token as a part of its normal network operations, the microcomputer 66 interrogates the output flag to see if there are any messages waiting for transmission. If the output flag is set, then the microcomputer system 66 proceeds to transmit the output message onto the communications network.

As mentioned above, the microcomputer system 66 maintains the Active Node table 20 and a virtual I/O W/R table 82 in the RAM 67. The Active Node table 20 is a complete map of all the stations in the logical ring and the sequence in which they pass the token. The Active Node table 20 is used by the microcomputer system 66 for network maintenance purposes. The microprocessor system 65 periodically, at one second intervals, reads the Active Node table 20 in the RAM 67 and prepares the Active Node Status Word 21. The Active Node Status Word 21 is 64 bits long with each bit corresponding to a respective station address on the communications network. The communications network in this embodiment is limited to 64 stations with the respective station addresses of 0 to 63. Station address 255 is reserved for broadcast messages. Each bit of the Active Node Status Word 21 therefore corresponds to a station address on the network, and the value of that bit indicates the actual presence of an active station at that address in the logical ring. A logic value of one indicates that a station is present in the logical ring at that address and a logic value of 0 indicates that there is not a station present in the logical ring at that address. Once the microprocessor system 65 has prepared the Active Node Status Word 21, it is placed in the shared RAM 55 and a flag (not shown) is set to indicate to the control section 50 the presence of an updated Active Node Status Word 21. The control section 50 takes the Active Node Status Word 21 from the shared RAM 55 and places it in the controller memory 54. The Active Node Status Word 21 is therefore available to the program in the control section 50 to indicate which stations are available on the logical ring, without the need for the control section 50 having to interrogate via high level query messages on the communications network.

Referring to FIGS. 4 and 5, the microcomputer system 66 also maintains the virtual I/O W/R table 82 in the RAM 67. The virtual I/O is used to describe input and output information which is generated by other stations on the communications network. The virtual I/O facility is a mechanism by which controllers on the communications network can communicate I/O data in a peer-to-peer fashion automatically without the need for high level messages. The manner in which the data in the virtual I/O image table is defined by each controller is an important aspect of this invention. The virtual I/O W/R table 82 consists of sixty-three sections in the RAM 67, each section corresponding to a respective one of the station addresses on the communications network.

The virtual I/O W/R table 82 is processed by the programmable controller 5 in a manner similar to the manner in which I/O image W/R table 81 is processed for physical I/O associated with the I/O rack 83. On every complete scan of the user program by the control section 50, the I/O image table 63 and the virtual I/O table 22 in the shared RAM 55 are updated with the contents of the I/O image W/R table 81 and the virtual I/O W/R table 82 in the RAM 67, respectively. The microprocessor system 65 of the communications section 52 performs this update on command by the control section 50. During this update process, those sections of the virtual I/O table 22 associated with other controllers in the cluster is updated with the most current input data from the virtual I/O W/R table 82 and the virtual I/O W/R table 82 is updated with the most current virtual I/O output data from this controller's section of the virtual I/O table 22. When the microcomputer system 66 is about to pass the token, the section of the virtual I/O image data corresponding to the address of this station in the virtual I/O W/R table 82 is extracted from the RAM 67 and formatted into the packet data field 39 of the token pass message. When that token pass message is broadcast, all of the other stations on the communications network will receive the virtual I/O image data from this station.

Figure 6:
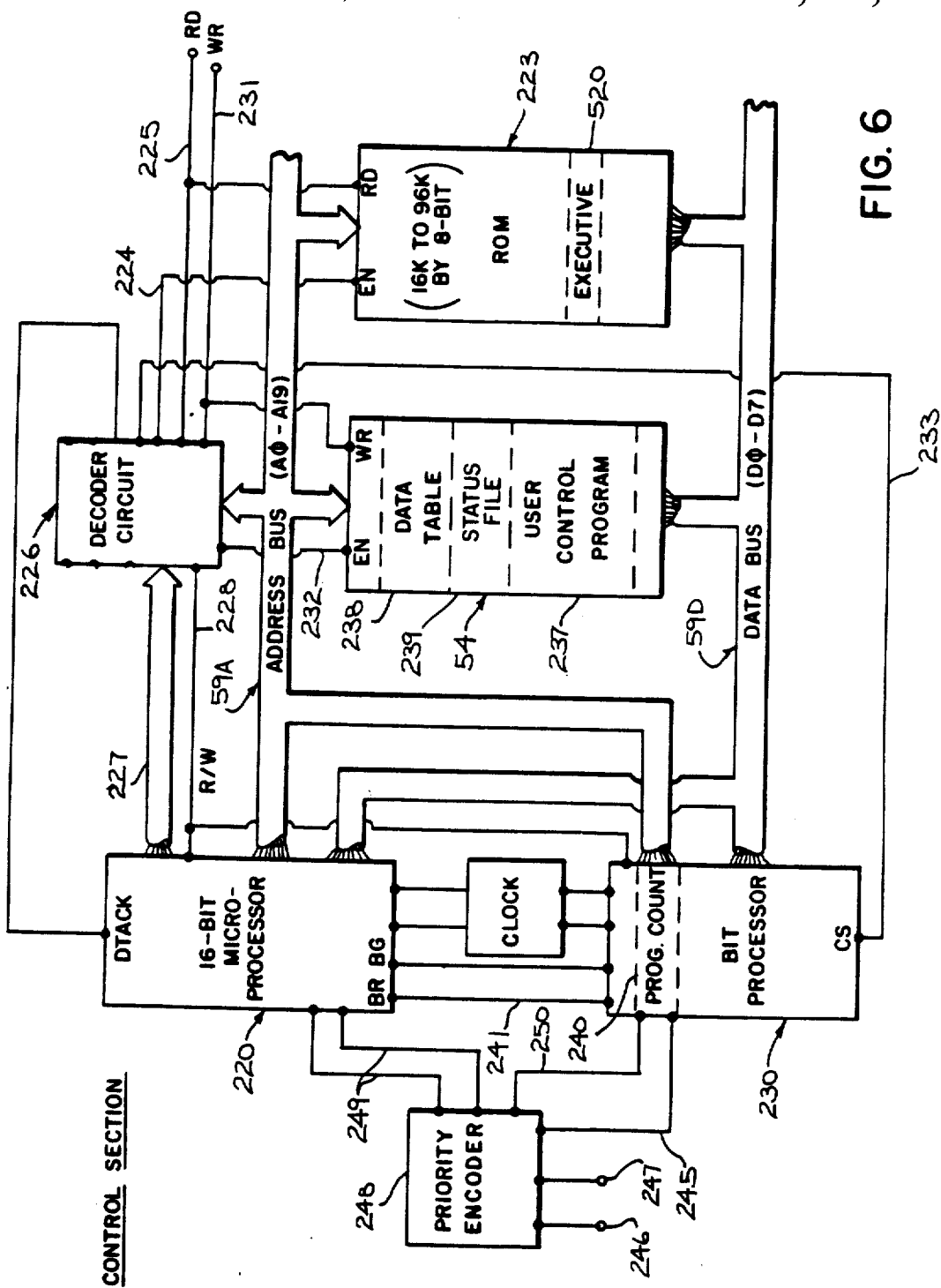
FIG. 6 is a schematic electrical diagram of the controller section of the programmable controller in FIG. 4.

Referring particularly to FIG. 6, the control section 50 is structured about a 16-bit microprocessor 220 which drives a 20-lead address bus 59A and an 8-lead data bus 59D. The microprocessor 220 executes machine language instructions which are stored in a read-only memory (ROM) 223 to carry out its functions. These machine language instructions are addressed by a program counter in the microprocessor 220 and they are read from the addressed line of the ROM 223 when an enable control line 224 and a read control line (RD) 225 are active. The fetched instruction is decoded and executed by the microprocessor 220 to carry out the indicated function. The functions performed in response to the execution of these machine language instructions and the organization of this firmware, will be described in more detail below. For a detailed explanation of the machine language instruction set as well as the structure and operation of the microprocessor 220, reference is made to the booklet entitled "MC68008 16-Bit Microprocessor With 8-Bit Data Bus" published in 1982 by Motorola, Inc.

Data may be read from or written to other elements of the system which are connected to the buses 59A and 59D. The particular element is enabled by a decoder circuit 226 which receives address data from the address bus 59A and control signals from a control bus 227 that is driven by the microprocessor 220. The decoder circuit 226 also receives a signal from an R/W control line 228 which may be driven either by the microprocessor 220 or by a separate bit processor 230. In addition to the RD control line 225 and the ROM enable control line 224 described above, the decoder circuit 226 drives a write enable (WR) control line 231, a RAM enable control line 232, and a bit processor enable line 233.

The random access memory (RAM) 54 connects to the buses 59 and 8-bit bytes of data may be read from or written to an addressed line therein when the RAM enable control line 232 is active. The RAM 54 stores a variety of data structures which will be described in more detail below. However, most of these structures form part of a user control program indicated at 237, a data table indicated at 238, or a status file 239. The user control program 237 includes one or more ladder programs that are comprised of instructions which are loaded into the RAM 54 through a programming terminal (not shown) which is connected to the programmable controller. A ladder program instruction may be executed either by the microprocessor 220 or the bit processor 230 as will be described in detail below.

When the microprocessor 220 executes a control program instruction, it employs an operation code in the instruction to locate a corresponding machine language interpreter routine which is stored in the ROM 223. The microprocessor 220 thus executes ladder program instructions by executing corresponding interpreter routines stored in the ROM 223. This interpretive technique for executing ladder programs is described in U.S. Pat. Nos. 4,165,534; 4,282,584 and 4,443,865.

The bit processor 230 is a custom integrated circuit which operates in tandem with the microprocessor 220 to execute directly selected ones of the ladder program instructions. The microprocessor 220 begins the execution of the ladder program (i.e. the program scan), but it immediately relinquishes control to the bit processor 230. This transfer of control is accomplished by writing the address of the ladder program instruction to a ladder program counter register 240 in the bit processor 230. The bit processor 230 then removes the microprocessor 220 from the buses 59 by enabling a bus request terminal through control line 241. The bit processor 230 fetches the ladder program instruction, executes it, and fetches subsequent ladder program instructions and executes them until one is encountered which it cannot execute. At that point, the bus request line 241 is released and the microprocessor 220 resumes control of program execution. The microprocessor 220 reads the contents of the ladder program counter register 240 into its own ladder program counter and proceeds to fetch and execute the indicated ladder program instruction. While the bit processor 230 is constructed to execute only a few "bit oriented" instructions, 75% to 95% of typical user ladder programs are comprised of these instructions. As a result, the total program scan time is significantly reduced by executing these few instruction types within the dedicated, high speed bit processor 230.

The bit processor 230 also includes a real time clock which produces an interrupt signal on control line 245 at regular intervals. This interrupt request, as well as two others on lines 246 and 247, are applied to the inputs of a priority encoder 248. The priority encoder 248 produces a 2-bit interrupt request to the microprocessor 220 on lines 249, and it indicates an interrupt request to the bit processor 230 through line 250. If the bit processor 230 has control at the moment of an interrupt request, it relinquishes control to the microprocessor 220 in the manner described above. The interrupt produced by the bit processor 230 is employed to implement a real time interrupt instruction. The interrupt on line 246 emanates from the communications section 52 of the programmable controller and the interrupt on line 247 is produced when a power loss is occurring, and in response, the microprocessor 220 is to take certain emergency actions to insure that the system halts gracefully.

Software Description

The network aspects of the present invention are implemented in a link layer protocol at each station in the network. The software which implements the link layer of the programmable controller 5 executes in the microcomputer 66 of FIG. 4, and is contained in an internal read only memory (not shown).

Figure 7:
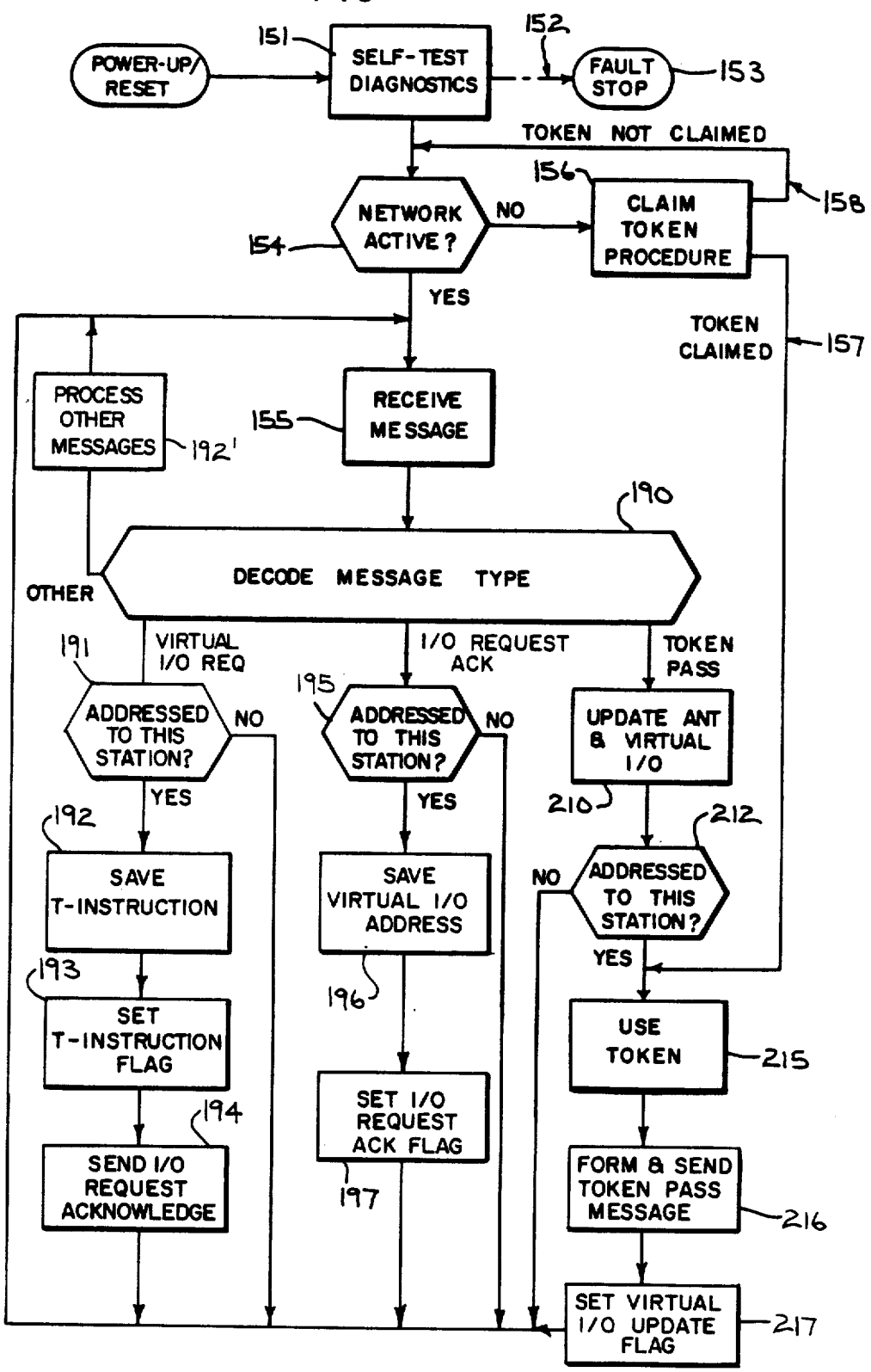
FIG. 7 is a flowchart of a program executed by a microcomputer in the communications section of the programmable controller of FIG. 4.

Referring to FIG. 7, when the microcomputer 66 is powered up, or reset, a self-test diagnostic routine is run as represented by process block 151. If any error is detected in the self-test diagnostics 151 an error exit 152 is taken and a fault state 153 is entered and no further processing is performed until the system is reset. If the self-test is successful, processing continues at decision block 154 where the station monitors the network to detect the presence of any activity on the bus 1.

If there is any activity heard on the network, processing continues to the receive message process block 155. If there is not any activity heard on the network at decision block 154 the network will continue to be monitored for a period of time equal to the network dead time-out value. After the network has been monitored for an amount of time equal to the network dead time-out value and there is still no activity heard on the bus, then processing transfers to the claim token procedure at process block 156. If no other station claims the token, the token is claimed by this station and exit 157 is taken to the use token process block 215. Otherwise, exit 158 is taken back to decision block 154 to listen for activity on the network.

The receive message procedure in process block 155 results in the input of a complete message with a valid CRC. Processing then continues to decision block 190 where the message type is decoded from the contents of the control byte 37. Specific actions are taken in accordance with the message type, although only the three message types which are pertinent to the present invention are specifically shown. All other messages are processed as indicated generally by the process block 192' and the system loops back to await receipt of the next message.

Referring to FIGS. 4 and 7, if the message type decoded in decision block 190 is a token pass, control passes to process block 210. At process block 210, the active node table 20 and virtual I/O W/R table 82 are updated with the information contained in the token pass message. These updates are performed whether or not the token pass message is addressed to this station. All other stations are also receiving this same token pass message and also update their active node table 20 and virtual I/O W/R tables 82 in exactly the same way. To update the table 20, the 1st and 3rd bytes 166 and 168 of the received token pass message are used. The 3rd byte identifies the source of the token pass message, in other words, the address of the station which had the token and the 1st byte identifies the destination of the token pass message. To update the active node table 20, the destination address is stored in the table 20 at the location corresponding to the indicated source address. This forms a link, or pointer, from the source station to the destination station in the table 20. By so monitoring and recording all such token passes on the network, a series of links, or pointers, are formed which eventually closes on itself thus forming a logical ring.

Similarly, the virtual I/O data 43 represented by the remaining bytes in the token pass message are stored in the section of the virtual I/O W/R table 82 corresponding to the source address of the message. The virtual I/O W/R table 82 thus contains the most current virtual I/O data collected from the station which just passed the token. As will be explained below, when this station receives the token, it will set a flag in the RAM 67 which indicates to the microprocessor 65 that the entire virtual I/O W/R table 82 is updated and should be transferred for use in the control section 50.

Referring still to FIGS. 4 and 7, after updating the tables 20 and 82, control passes to decision block 212, where the destination address of the incoming token pass message is examined to determine if the token pass is addressed to this station. If the token is not addressed to this station, then no further processing is necessary and control loops back to the receive message procedure 155. If the token pass is addressed to this station, then this station now possesses the token and control transfers to the use token procedure in process block 215. The use token procedure 215 consists of processing output messages in the message buffers 80, and eventually passing the token on to the next station in the logical ring. The token pass message is formed as indicated at process block 216 by reading the section of the virtual I/O W/R table 82 which corresponds to this station, and broadcasting that data as part of the token pass message. As indicated at 217, a flag is then set in the RAM 67 which notifies the microprocessor system 65 that the other sections of the table 82 should be passed to the control section 50.

Referring still to FIGS. 4 and 7, when a received virtual I/O request message is detected at decision block 190, the destination code therein is checked at decision block 191 to determine if it is directed to this station. If it is, the T-instruction contained in this message is extracted and saved in the RAM 67 as indicated at block 192 and a flag is set in the RAM 67 to signal the microprocessor 65 of the presence of this new input message as indicated at block 193. As indicated at process block 194, an I/O request acknowledge message is then formed and transmitted on the network back to the station which originated the virtual I/O request message. This acknowledge message includes a pointer, or address, which indicates where the requested virtual I/O data will be located in the virtual I/O table section for this station. This same information is saved with the T-instruction in the incoming virtual I/O request message where it is read by the microprocessor 65 and processed by the control section 50 as will be described below.

When an I/O request acknowledge message is received by this station, as determined at decision block 190, a determination is made at block 195 as to whether it is directed to this station. If so, this message is stored in the message buffers section 80 of the RAM 67 as indicated by process block 196, and an I/O request ACK flag is set at process block 197. The microprocessor 65 passes this information on to the control section 50 where it is used as will be described below. In any case, the system loops back to process block 155 to await receipt of another message.

To summarize, in order to implement the present invention, the link layer software executed by the microcomputer 66 performs three basic functions. First, it receives and stores virtual I/O data which accompanies the token pass performed by each controller in the cluster. Second, when directed to do so, it sends a virtual I/O request message to another controller in the cluster just as it sends any other message on the communications network. In response to such a message, it receives back an I/O request acknowledge message which contains a virtual I/O image table address that the link layer passes back to the controller. And third, the link layer receives a virtual I/O request message, passes it to the controller, and prepares and sends back an I/O request acknowledge message.

Figure 8:
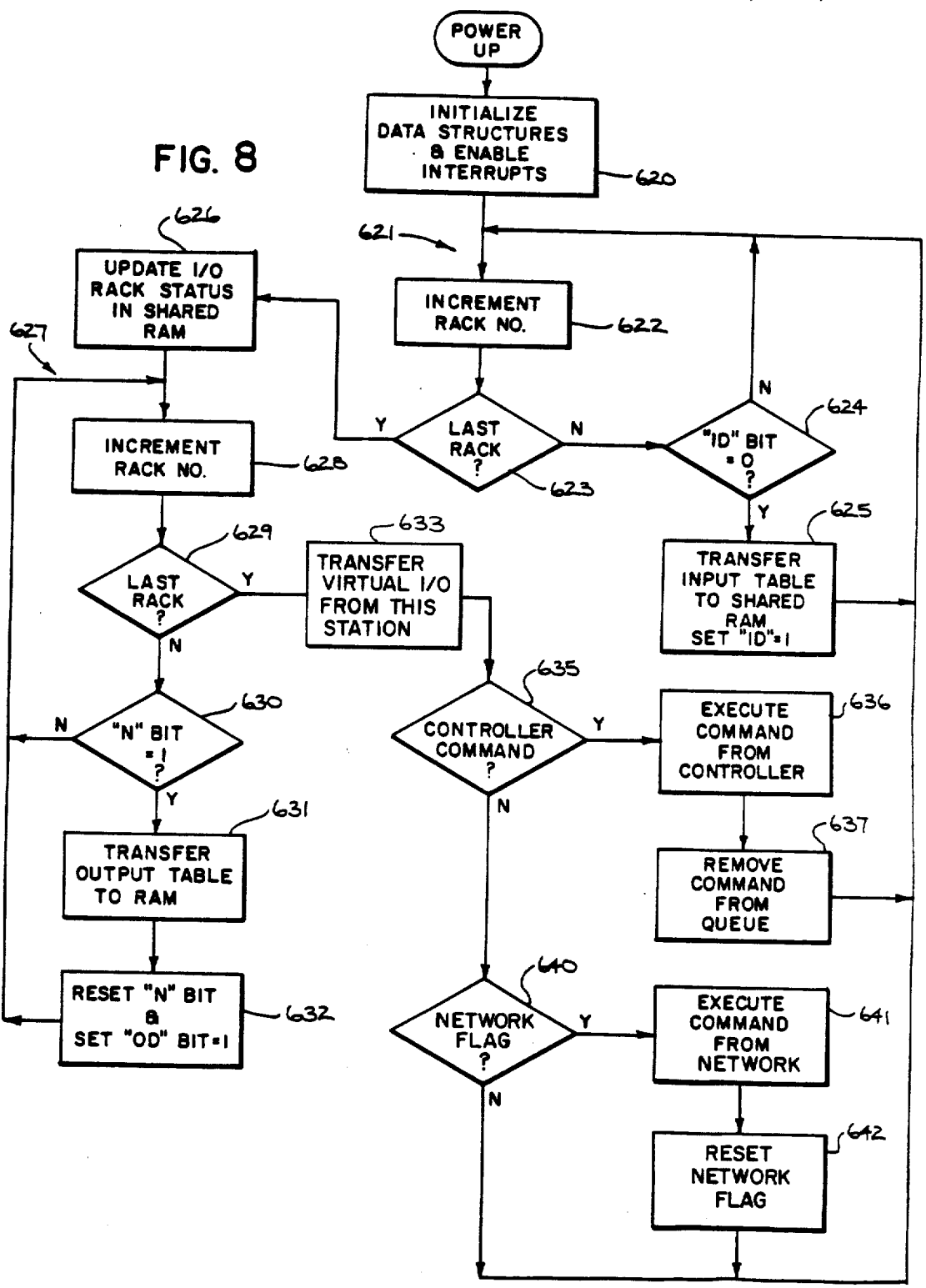
FIG. 8 is a flowchart of a program executed by a microprocessor system in the communications section of the programmable controller of FIG. 4.

Referring particularly to FIGS. 4 and 8, the primary functions of the communications section 52 is to perform an I/O scan of the remote I/O racks 83, and to process messages which are received or transmitted through the communications network 1. These functions are carried out by the microprocessor system 65 under the direction of a stored scheduler program.

Referring particularly to FIG. 8, the scheduler is entered at power up and a set of instructions are executed at 620 to initialize data structures in both the shared RAM 55 and the RAM 67. Interrupts are also enabled and a loop is entered at 621 to input data from each active remote I/O rack 83. The rack number is incremented at process block 622 and if the last I/O rack has not been examined, the scheduler branches at decision block 623 to check the "ID" bit in the I/O rack status. This bit is set to zero by the microcomputer 66 when it has updated the input image table 81 with the current status of input devices connected to the I/O rack 83. When detected at decision block 624, this current input image is transferred from the RAM 67 to the corresponding locations in the input image table 63 of the shared RAM 55. Otherwise, the system merely loops back to process block 622.

This transfer is accomplished at process block 625 and the ID bit for the indicated I/O rack 83 is then set to "1" before looping back to process block 622 to check the inputs from the next I/O rack 83. The input scan loop 621 thus updates the input portion of the I/O image table 63 in the shared RAM 55 each time the microcomputer 66 reads a new set of inputs in from each remote I/O rack 83.

After scanning the inputs, the scheduler branches at decision block 623 to a set of instructions indicated by process block 626. These update the I/O rack status in the shared RAM 55. A loop is then entered at 627 in which the output image is transferred to the RAM 67 from the shared RAM 55. More specifically, the I/O rack number is incremented at 628 and if the last rack has not been checked, the scheduler branches at decision block 629 to check the "N" bit in the I/O rack status in the shared RAM 55. If it is set to "1", as determined at decision block 630, the system loops back to process block 628, otherwise, it is "1" and the outputs for the indicated I/O rack have been recently updated by the control section 50. These updated outputs are transferred from the output portion of the I/O image table 63 in the shared RAM 55 to the corresponding location in the output image table 81 of the RAM 67, as indicated at process block 631. The "N" bit is reset in the shared RAM 55, and the "OD" bit for the indicated I/O rack is set to "1" in the RAM 67 at process block 632. The scheduler then loops back to process block 620 to check the next I/O rack. When the loop 627 is exited at decision block 629, all outputs which have been updated by the control section 50 are passed on to the RAM 67 for transmission to the proper remote I/O rack 83. In addition, as indicated by the process block 633, the section of the virtual I/O table 22 in the shared RAM 55 which corresponds to this station is transferred to the virtual I/O W/R table 82 in the RAM 67. Thus, the I/O data required from the controller processor by other stations on the communications network is updated for transmission during the next token pass.

Referring still to FIG. 8, after updating inputs and outputs, the scheduler checks the command queue in the RAM 67 to determine if any commands from the control section 50 require processing. If so, as determined at decision block 635, the indicated command is executed at process block 636 and the command is then removed from the queue 706 at process block 637 and the system loops back to process block 622. A typical command may be to transfer a message, such as a virtual I/O request message, in the communications section 62 of the shared RAM 55 to the message buffers 80 in the RAM 67.

If no controller commands are queued up, the communications network flags in the RAM 67 are checked at decision block 640. If a message has been received, the appropriate command is executed at process block 641 and the network flag is reset at block 642. In either case, the system loops back to process block 622. Such a command may be, for example, to transfer a received virtual I/O request message from the RAM 67 to the section 62 in the shared RAM 55. Another flag, the I/O request acknowledge flag, calls for the transfer of an I/O request acknowledge message from the RAM 67 to the shared RAM 55, and the virtual I/O update flag calls for the transfer of the virtual I/O W/R table 82 in the RAM 67 to the virtual I/O table 22 in the shared RAM 55. This transfer of the virtual I/O W/R table 82 includes the data for all sections except the section which corresponds to this station.

It should be apparent from the above description that, for the purpose of the present invention, the scheduler program executed by the microprocessor system 65 operates primarily as a conduit for information flowing between the control section 50 and the communications section 52. This function is necessary because of the particular architecture of the programmable controller described herein. It should be apparent to those skilled in the art that the many copies of the virtual I/O which are maintained herein are also a result of this architecture. In other controllers, neither the copies of the virtual I/O nor the hardware and software needed to keep them all up to date may be required.

Before discussing the operation of the control section 50 as it relates to the present invention, the data structures stored in the RAM 54 of the control section 50 will be described in more detail.

Figure 9A:
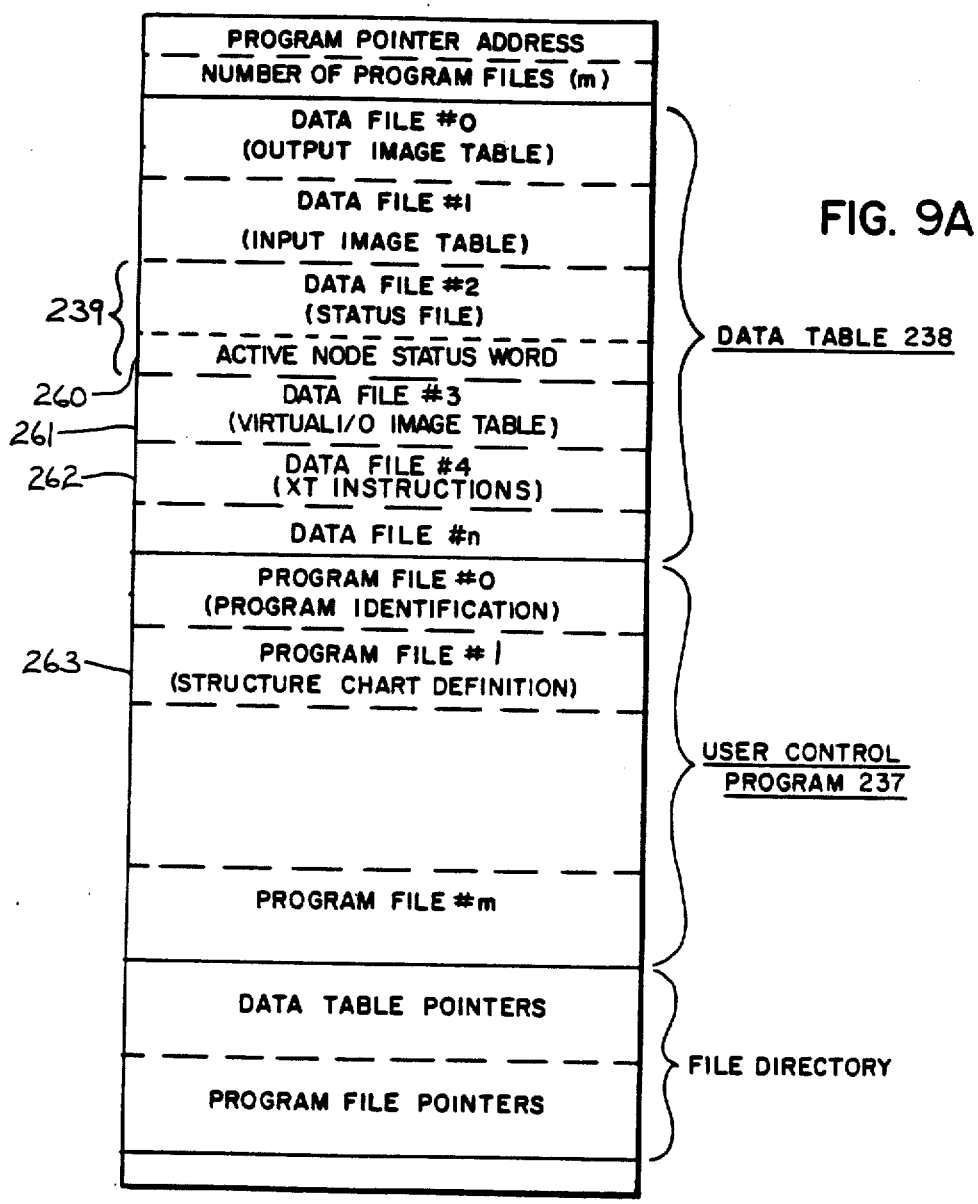
FIG. 9A is a schematic representation of data structures stored in the controller section of the programmable controller of FIG. 4.

Referring particularly to FIGS. 6 and 9A, the RAM 54 in the control section 50 stores a number of data structures which are required for the operation of the programmable controller and the practice of the present invention. These are shown in very general form in FIG. 6 as the data table 238, the status file 239 and the user control program 237. The data table 238 is shown in more detail in FIG. 9A, and it includes a plurality of separately addressable files #0 through #N. The first four of thse files are reserved for very specific purposes. Data file #0, for example, is the output image table which indicates the desired state of all operating devices connected to this programmable controller. This output table is changed by the control section 50 as it executes the user control program 237, and it is periodically output to the shared RAM 55 as part of the I/O scan program described in more detail herein. On the other hand, data file #1 is the input image table which indicates the state of the sensing devices connected to this programmable controller. This file is input from the shared RAM 55 during the I/O scan program and it is examined during the execution of the user control program 237.

Referring to FIGS. 4 and 9A, data file #2 is the status file 239. In addition to containing information regarding the state of this controller, including flags and vectors used in exchanging data and messages with the communications section 52, the status file 239 includes an active node status word 260. This is a copy of the 64-bit active node table 20 stored in the RAM 67 of the communications section 52. As indicated above, each bit in this word 260 indicates whether a controller is actively communicating on the network 1. This information is useful when practicing the present invention in that it enables the user to check the status of other controllers in the cluster before relying on input data from that controller. In other words, the user program 237 may include instructions which examine the status of a particular controller before executing any T-instructions involving that controller.

Referring still to FIGS. 4 and 9A, data files #3 and #4 are particularly pertinent to the practice of the present invention. Data file #3 is the virtual I/O image table 261 which is a copy of that stored in both the RAM 67 and shared RAM 55 which is shown in greater detail in FIG. 5. During the I/O scan portion of the executive program executed by the controller section 50, the section of the virtual I/O image table 261 corresponding to this station is output to the shared RAM 55 for subsequent transmission to the other stations on the network 1. At the same time, those sections corresponding to the other stations on the network 1 are input from the table 22 in the shared RAM 55 to provide the controller section 50 updated input data from other stations.

I/O data is transferred between the virtual I/O image table 261 and other files in the data table 238 by XT instructions which are stored in data file #4 and indicated at 262. As will be explained in more detail below, these XT instructions are created by the controller section 50 in response to virtual I/O request messages received from other stations on the network 1. They are executed periodically by the controller section 50 to make the indicated data transfers.

As described in more detail in the above-cited copending application entitled "Programmable Controller With Function Chart Interpreter", the user control program 237 is comprised of one or more files which each contain a control program. Each such control program may be in any one of a number of programming languages, such as BASIC, ladder logic or assembler, and these are executed in a sequence indicated by a structure chart definition 263 stored as program file #1. In the preferred embodiment of the invention, the T-instructions of the present invention are extensions of the ladder logic programming language commonly found in commercially available programmable controllers. These T-instructions are similar to other instructions in this well known instruction set, and they may be inserted by the programmer, or user, into any of the stored ladder logic program files. They will be executed as part of the user program execution which is described in more detail below. This extended instruction set includes the following T-instructions:

| Mnemonic | Description |
| --- | --- |
| TXC | Examine input closed on another controller. |
| TXO | Examine input open on another controller. |
| TOE | Energize an output on another controller. |
| TGT | Get a byte/word from another controller. |
| TPT | Put a byte/word to another controller. |

Figure 9B:
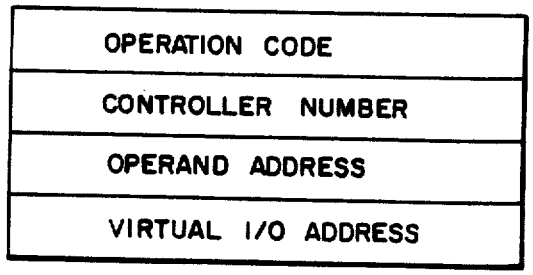
FIG. 9B is a schematic representation of a T-instruction.

The structure of a T-instruction is illustrated in FIG. 9B. The first word of the instruction is an operation code which identifies one of the above five instructions, and the second word indicates which of the other 63 controllers on the network is the object of the instruction. The third word is the address in the other controller where the operand can be found, and the fourth word is a location in the virtual I/O image table where this remote data can be found in this controller. Whereas the programmer/user enters data through the programming terminal which produces the first three words of each such T-instruction, the fourth word is produced automatically when the controller is switched to the RUN mode and the user control program is prescanned for new T-instructions.

It should be apparent to those skilled in the art that many other instructions requiring the transfer of data to or from another controller in the cluster are possible and that the present invention is not limited to any particular instruction set.

Referring particularly to FIGS. 6 and 10, the operation of the control section 50 is controlled by an executive routine 520 which is stored in the ROM 223. When the programmable controller is powered up, a set of instructions indicated by process block 521 are executed to create and initialize the data structures stored in the RAM 54. If the system is in the "RUN" mode as determined at decision block 522 a prescan process is begun, as indicated at process block 523. Otherwise, the system branches to execute the program corresponding to the indicated mode as indicated at process block 520 and loops back to the decision block 522. All programs of the ladder type are scanned to set all their rungs false, the output image table is written to both the local I/O rack and the shared RAM 55 in the local I/O section 51, and the input image table is updated by reading input status from both the local I/O rack and the shared RAM 55. These functions are indicated collectively by the process block 550 in FIG. 12, which is a flowchart of the prescan portion of the executive routine 520.

Figure 12:
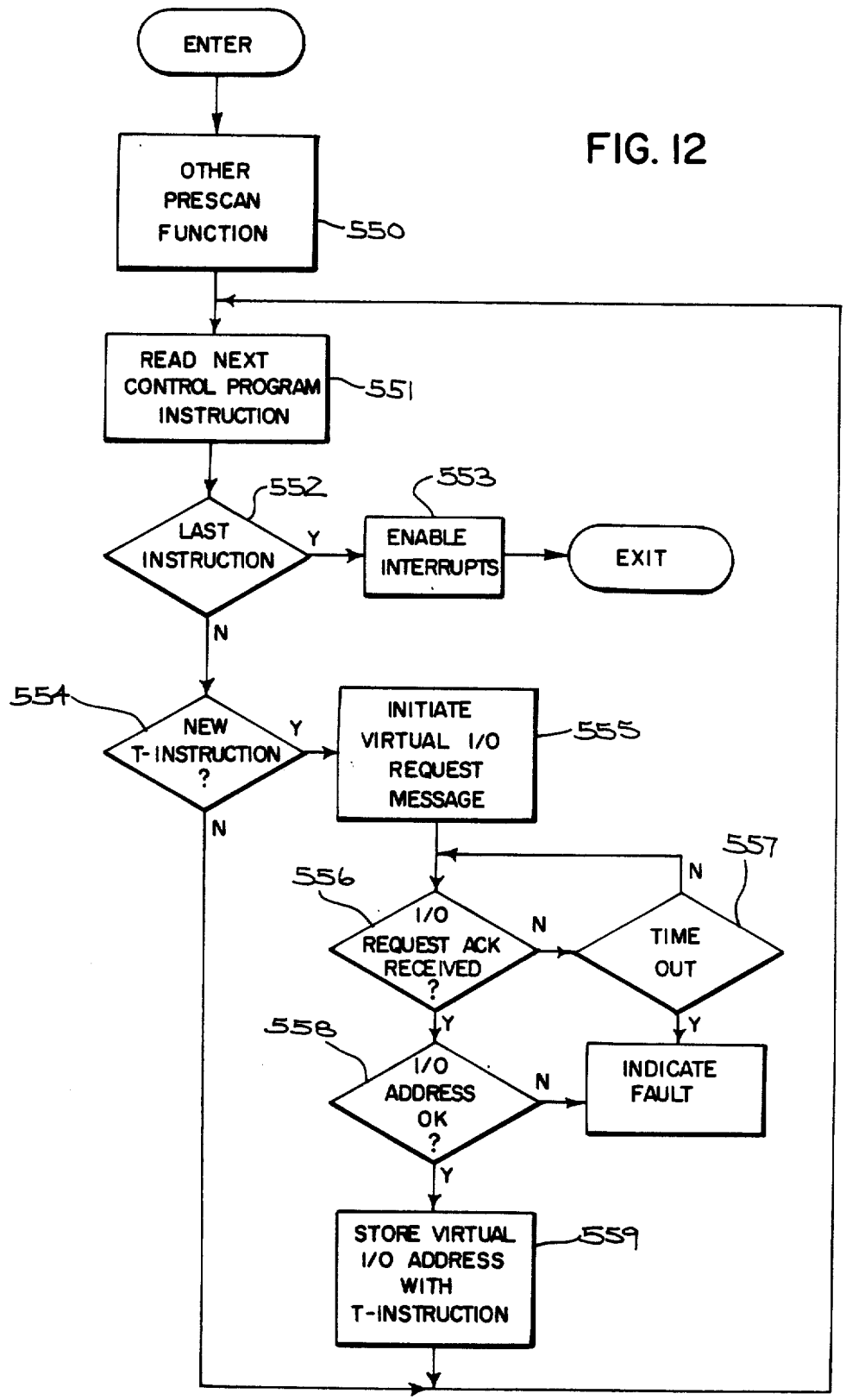
FIG. 12 is a flowchart of a prescan portion of the program in FIG. 10.

Referring now to FIG. 12, the user control program is scanned to locate T-instructions. More specifically, a loop is entered at process block 551 in which successive controller instructions in the user control program 237 are read from the RAM 54 and examined to determine if they are T-instructions which do not, as yet, have virtual I/O addresses. When the last instruction is examined, the program branches at decision block 552, the interrupts are enabled at 553, and the executive program continues as shown in FIG. 10.

A T-instruction includes an operation code and a three-word operand. The first word of the operand identifies one of the other sixty-three controllers in the cluster, and the second word identifies the I/O address of the particular data in that controller which is the object of the instruction. The third word in the operand is blank for a new T-instruction and this is detected at decision block 554. If it is not a new T-instruction, the system loops back to process block 551, otherwise, the controller section 50 initiates a virtual I/O request message as indicated at process block 555. This message includes the entire T-instruction which is written to the communications section 62 of the shared RAM 55. If the T-instruction is to receive data from the other controller, the third word remains blank, whereas if data is to be output to the other controller, a virtual I/O image table address in this controller's section of the virtual I/O image table is sent with the T-instruction. As indicated above, the other sections of the programmable controller 5 will complete the formulation and sending of the message and will deliver the resulting I/O request acknowledge message back to the shared RAM 55. This is detected at decision block 556. The controller section 50 loops until the acknowledge is received, but if it isn't received in a timely manner, as indicated at 557, a fault is indicated. This can occur, for example, if the other controller is not operating or has not become active on the communications network. A received message is checked to see that a valid virtual I/O address is contained therein at decision block 558 and, if so, that address is stored as the third word of the T-instruction's operand as indicated at 559 and the system loops back to process block 551. When the T-instruction is subsequently executed while in the RUN mode, the operation code and first word are examined to determine which section of the virtual I/O image table is involved and the fourth word, the virtual I/O address, is examined to locate the precise word or bit in that section.

Referring again to FIG. 10, after the prescan the executive program enters a loop in which the user control program is continuously and repeatedly executed. As indicated by process block 524, a structure chart interpreter routine is executed which selects a ladder program file to execute. A ladder program interpreter routine 525 is then executed to run the selected ladder program file. After a single scan through the operative ladder program, all of the XT instructions stored in the RAM 54 are executed as indicated at 526. As will be explained in more detail below, the XT instructions are formed when this controller receives a virtual I/O request from another controller in the cluster. As illustrated in FIG. 11, each XT instruction includes an operation code which indicates whether the I/O data is to be sent to or received from the other controller and whether the data is a single bit or a word. The T-instruction contains the address in the controller's own data table which is involved in the transfer and the section number and address of the pertinent data in the virtual I/O image table 261. The XT instruction is executed by transferring the indicated bit or word between these two locations in the direction indicated by the operation code.

Referring to FIG. 10, after all of the XT instructions have been executed, an I/O scan is performed as indicated at process block 527. This is a conventional I/O scan in which the output image table in the RAM 54 is written directly to the local I/O and the input image table is updated by directly reading the local I/O rack. The remote I/O racks 83, however, are updated by writing to and reading from the I/O image table 63 in the shared RAM 55. After completion of the I/O scan, the system flags in the shared RAM 55 are checked, and if a mode change has taken place, the system branches at decision block 528. Otherwise, the system loops back to the structure chart interpreter 524 to select the next ladder program to run.

Figure 13:
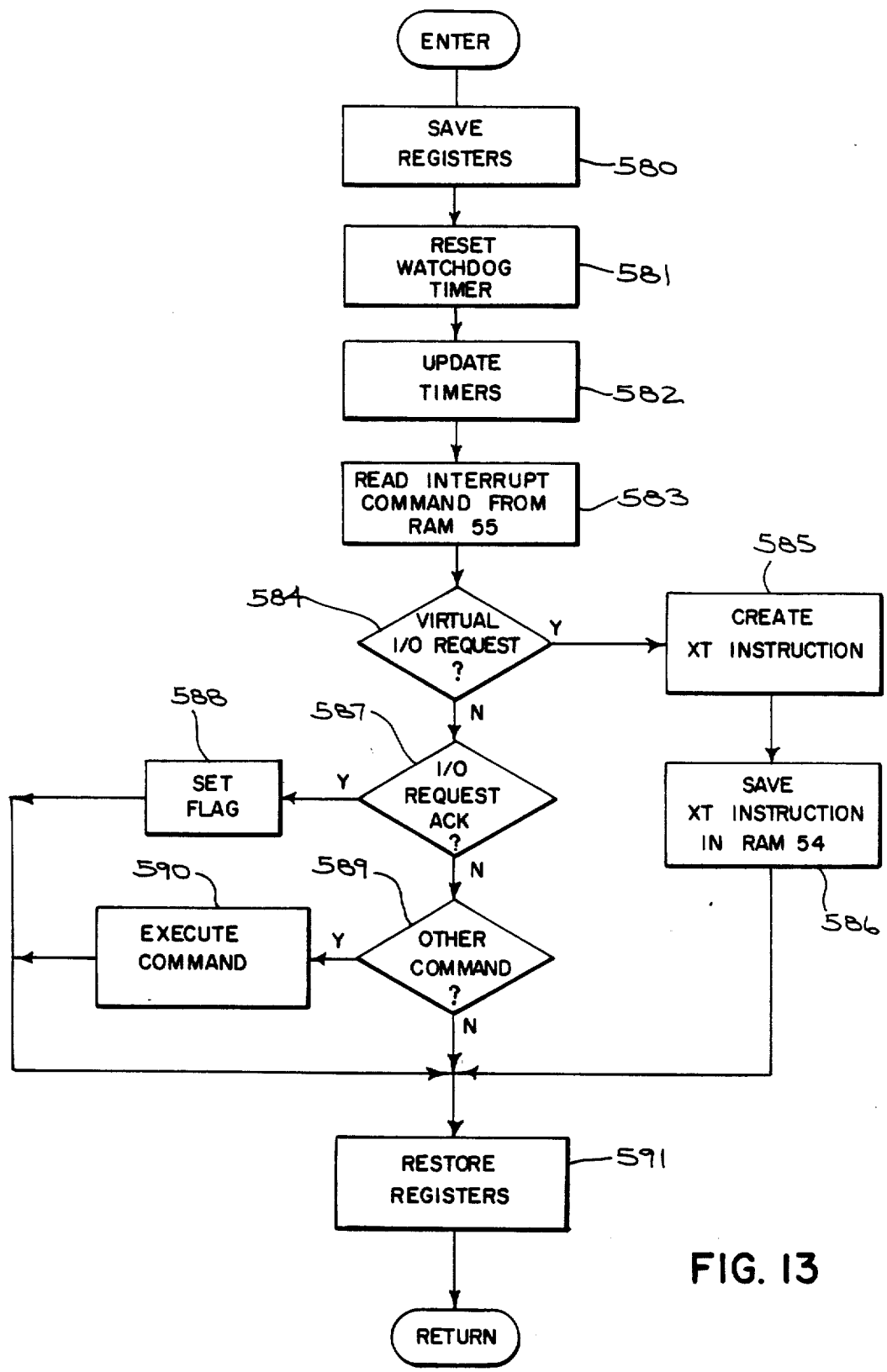
FIG. 13 is a flowchart of an interrupt service routine executed by the controller section of FIG. 6.

Referring particularly to FIGS. 6 and 13, the operation of the control section 50 is interrupted every ten milliseconds by the communications section 52. When this occurs, control of the buses 59A and 59D is given to the 16-bit microprocessor 220 and a ten millisecond interrupt service routine illustrated in FIG. 13 is executed. As indicated by process block 580, the state of the microprocessor's registers are saved in the RAM 54 and a watchdog timer is reset as indicated by process block 581. The real time clock used by the timer instructions is then updated at process block 582, and a control interrupt command word is read from the shared RAM 55 (FIG. 4), as indicated at process block 583.

If this command indicates that a virtual I/O request message has been received, the program branches at 584 and the message is read from the communications section 62 of the shared RAM 55. As indicated at process block 585, an XT instruction is then created which has the format described above with reference to FIG. 11. This XT instruction is stored in data file number 4 in the data table portion of the RAM 54 as indicated at process block 586. If the command is not a virtual I/O request, as determined at decision block 584, the system branches to decision block 587.

If the control interrupt command indicates that an I/O request acknowledge message has been received back from the destination controller, the system branches at block 587. A flag is then set at process block 588, and as indicated above with reference to FIG. 12, the virtual I/O address contained in this message is extracted and stored with the T-instruction that originated the virtual I/O request. If the command is not an I/O request acknowledge message, as determined at decision block 587, the system branches to decision block 589.

Other commands may be executed during the interrupt service routine. These commands are detected at decision block 589 which branches to the appropriate portion of the program, indicated collectively in FIG. 13 as the process block 590. These other commands are not pertinent to the present invention. In any case, the program reaches the process block 591 from the blocks 586, 588, 589 and 590 in which the microprocessor registers are restored and the system returns to its interrupted task.

We claim:

1. A controller for use in a cluster with other similar controllers that are interconnected with a communications network that enables messages containing data to be broadcast between the controllers, which comprises:

memory means for storing a virtual I/O image table, said table including a section of data for each controller in the cluster;

first broadcast means coupled to the memory means and the communications network for periodically sending a first message on the communications network which broadcasts the controller's own section of data in the virtual I/O image table to the other controllers in the cluster;

first receiver means coupled to the memory means for receiving first messages broadcast on the communications network by other controllers in the cluster and storing the section of data in the corresponding section of the virtual I/O image table in said memory means;

control program storage means for storing a user control program containing instructions which operate an I/O data associated with this controller and T-instructions which operate on I/O data associated with other controllers in the cluster;

prescan means coupled to the control program storage means for identifying T-instructions contained therein;

virtual I/O request message means coupled to the prescan means and the communications network for broadcasting a virtual I/O request message on the communications network to the other controller associated with an identified T-instruction, the virtual I/O request message including data which identifies the I/O data to be operated upon by the identified T-instruction;

means coupled to the virtual I/O request message means for mapping an operand address in each identified T-instruction with a location in the stored virtual I/O image table; and control program execution means coupled to the control program storage means and the memory means, the control program execution means executing the instructions and the T-instructions in the user control program, wherein the execution of the T-instructions is performed by operating on data in the stored virtual I/O image table.

2. The controller as recited in claim 1 in which the communications network is a token passing network in which each controller periodically receives a token pass message from other controllers and broadcasts a token pass message to the other controllers and in which said first message containing the controller's own section of data in the virtual I/O image table is broadcast with said token pass message.

3. The controller as recited in claim 1 which includes means for receiving I/O request acknowledge messages from other controllers to which virtual I/O request messages are broadcast; and in which the means for mapping the operand address in each T-instruction includes:

means responsive to an operation code in the T-instruction which indicates transfer of data to the other controller to assign a location in this controller's section of the virtual I/O image table, and to include this assigned location in the virtual I/O request message; and means responsive to an operation code in the T-instruction which indicates transfer of data from the other controller to include the operand address in the T-instructions in the virtual I/O request message which is broadcast to the other controller and to store a virtual I/O address contained in the responsive I/O request acknowledge message which indicates the location in the other controller's section of the virtual I/O image table in which the I/O data is stored.

4. The controller as recited in claim 3 which includes means responsive to virtual I/O request messages broadcast by another controller in the cluster to create and store an XT instruction, and in which each such stored XT instruction is executed by said control program execution means to transfer I/O data between the virtual I/O image table in said memory means and a data table which stores data indicative of the state of the I/O devices connected to the controller.

5. The controller as recited in claim 4 in which said means responsive to virtual I/O request messages also includes means for broadcasting an I/O request acknowledge message to the other controllers.

6. The controller as recited in claim 5 in which the I/O request acknowledge message includes virtual I/O address data which identifies a location in the virtual I/O image table.

7. A controller for use in a cluster with other similar controllers that are interconnected with a communications network that enables messages containing data to be broadcast between the controllers, which comprises:
   a memory for storing a user control program which is comprised of instructions that operate on data associated with the controller and T-instructions, each of which T-instructions includes an operand address that identifies specific data associated with another controller in the cluster;
   data table storage means for storing data associated with the operation of the controller;
   virtual I/O image table storage means for storing data associated with other controllers in the cluster;
   control program execution means coupled to said memory, said data table storage means and said virtual I/O image table storage means for executing the instructions and the T-instructions in the stored user control program, said control program execution means including:
   (a) means responsive to an operation code in said instructions for carrying out an indicated operation on data in said data table storage means; and
   (b) means responsive to an operation code in said T-instructions for carrying out an indicated operation on specific data in said virtual I/O image table storage means;
   prescan means coupled to the memory and the communications network for examining the T-instructions in the stored user control program prior to their execution by the control program execution means and producing a virtual I/O address for each T-instruction which indicates the specific data in said virtual I/O image table storage means which corresponds with the specific data associated with another controller that is identified by the T-instructions' operand address; and
   update means coupled to the virtual I/O image table storage means and the communications network for periodically updating data in said virtual I/O image table storage means with data received from other controllers in the cluster.

8. The controller as recited in claim 7 which includes I/O scanner means which couples to the data table storage means for periodically updating data in said data table with data associated with the equipment which the controller operates.

9. The controller as recited in claim 7 in which the prescan means includes a means for sending a virtual I/O request message to the other controller identified by the operand address in a T-instruction, the virtual I/O request message including the operand address in the T-instruction.

10. The controller as recited in claim 9 which includes means coupled to the communications network for receiving I/O request message from other controllers in the cluster, and said update means includes means for periodically sending on the communications network the specific data identified by the operand address in a received I/O request message.

11. In a cluster of controllers which are connected together by a communication network and in which each controller is operable to execute its own control program to examine the condition of input devices connected to the controllers and to operate output devices connected to the controllers, the improvement comprising:
   means coupled to each controller for periodically sending virtual I/O data on the communications network to other controllers, said virtual I/O data including the state of input devices connected to the sending controller and the state of output devices connected to other controllers; and
   prescan means coupled to the communications network and being operable to examine the control program executed by each controller and to send messages on the communications network which indicates the virtual I/O data that each controller is to periodically send.

* * * * *